United States Patent Office 2,802,016
Patented Aug. 6, 1957

2,802,016

POLYCARBOXYLATES

Joachim Dazzi, Dayton, Ohio, assignor to Monsanto Chemical Company, St. Louis, Mo., a corporation of Delaware No Drawing. Application March 4, 1953,
Serial No. 340,413

4 Claims. (Cl. 260—404.8)

The present invention relates to adducts and more particularly provides new polycarboxylates, methods of preparing the same by the addition reaction of certain fumarates with certain esters of acylricinoleic acids, and vinyl chloride polymers plasticized with the new polycarboxylates.

According to the invention there are provided addition products having the formula:

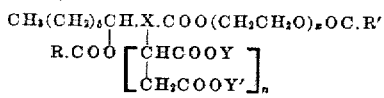

in which R, R', Y and Y' are alkyl radicals of from 1 to 5 carbon atoms, X is a mono-alkenyl radical of 10 carbon atoms, $n$ is an integer of from 1 to 3, and $x$ is an integer of from 1 to 5.

Polycarboxylates having the above formula may be readily prepared by contacting an acylated ricinoleate having the formula:

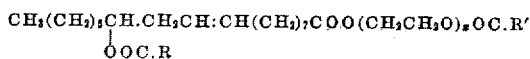

in which R and R' are as above defined, with a dialkyl fumarate of from 6 to 14 carbon atoms.

Acylated ricinoleates having the above formula and useful for the present purpose are, for example the acetates, propionates, butyrates, valerates and n-hexoates of the ethylene glycol or the polyethylene glycol esters of acylated ricinoleates such as 2-hydroxyethyl 12-acetoxy-9-octadecenoate, 2-(2-hydroxyethoxy)ethyl 12-propionyloxy-9-octadecenoate, 2 - [2 - (2 - hydroxy-ethoxy)ethoxy] ethyl 12-acetoxy-9-octadecenoate, 2-(2-hydroxyethoxy)-ethyl 12-n-butyryloxy-9-octadecenoate, 2-hydroxyethyl 12-valeroyloxy-9-octadecenoate, 2-(2-hydroxyethoxy)ethyl 12-hexoyloxy-9-octadecenoate, the tetraethylene glycol ester of 12-acetoxy-9-octadecenoic acid or the pentaethylene glycol ester of 12-propionyloxy-9-octadecenoic acid. The presently useful esters are readily obtainable by reaction of the appropriately 12-acylated ricinoleic acid with ethylene oxide to obtain the mono-, di-, tri-, tetra- or pentaethylene glycol ester and esterification of the terminal hydroxy radical thereof with the appropriate carboxylic acid, acyl halide or acid anhydride.

Alkyl fumarates which are condensed with the above acylated ricinoleates are the simple diesters such as methyl, amyl, ethyl, n-propyl or isobutyl fumarate and the mixed esters such as ethyl isopropyl fumarate, isobutyl methyl fumarate or ethyl methyl fumarate.

Reaction of the ethylene glycol or polyethylene glycol ester of the acylated ricinoleate with the fumarate is effected by simply heating a mixture of the two reactants at temperatures of from, say, 100° C. to 300° C., depending upon the nature of the individual reactants and of the properties desired in the final product. The reaction is generally effected at atmospheric pressure, but pressures below atmospheric or above atmospheric may be used. Condensation catalysts may be employed. The reaction results in the addition of from 1 to 3 moles of the fumarate at the alkenyl portion of the ricinoleate. Thus the reaction of a simple dialkyl fumarate such as methyl fumarate with an ester like 2-acetoxyethyl acetylricinoleate can yield adducts in which from 1 to 3 moles of the fumarate have reacted with the ricinoleate, depending upon the reaction time and the proportion of reactants used:

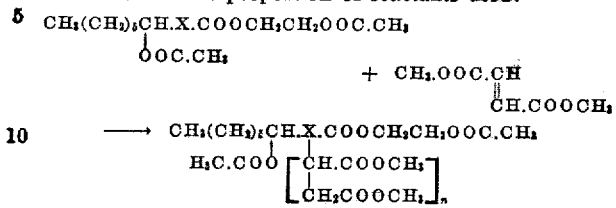

in which $n$ is an integer of from 1 to 3 and X is a mono-alkenyl chain of 10 carbon atoms.

The present adducts are stable, high-boiling, clear and substantially colorless products which range from viscous liquids to semi-solid masses. They may be advantageously employed for a variety of industrial purposes, e. g., as lubricant additives, as intermediates for the production of surface-active agents, etc. They are particularly valuable as plasticizers for vinyl chloride polymers, the present esters serving not only to soften vinyl chloride polymers, but also to impart simultaneously a high degree of low temperature flexibility, very good temperature stability and great mechanical strength to these polymers. They are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 to 50 percent by weight of plasticizer will, in most cases, be satisfactory for general utility. The good flexibility of the plasticized compositions increases with increasing plasticizer concentration.

The present polycarboxylates are valuable plasticizers for polyvinyl chloride and copolymers of at least 70 percent by weight of vinyl chloride and up to 30 percent by weight of an unsaturated monomer copolymerizable therewith, for example vinyl acetate, vinylidene chloride, etc.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument and Manufacturing Company is used for this determination and expresses the hardness in units of from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerable, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in temperature often results in decreased flexibility of a plasticized polymer composition so does a decrease in a plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The invention is further illustrated, but not limited, by the following examples:

Example 1

To a flask equipped with a reflux condenser and mechanical stirrer there were placed 94.0 g. (0.2 mole) of 2-(2-acetoxyethoxy)ethyl acetylricinoleate and 103 g. (0.6 mole) of diethyl fumarate, the mixture was brought to refluxing (215° C.) within 32 minutes and refluxed (215–250° C.) for about 7 hours. Subsequent heating of the product to remove all material boiling up to 250°/2–4 mm. gave as residue 124 g. of the semi-viscous adduct, $n_D^{25}$ 1.4712. Based on the recovered reactants, the residue is a 2-(2-acetoxyethoxy)ethyl acetylricinoleate-diethyl fumarate adduct in which 1 mole of the ricinoleate has added to an average of 1.26 moles of the fumarate.

Example 2

A mixture consisting of 60 parts by weight of polyvinyl chloride and 40 parts by weight of the adduct of Example 1 was milled to a homogeneous blend. During the milling there was observed substantially no fuming and discoloration. A molded sheet of the milled blend was clear, transparent and substantially colorless. Testing of the molded sheets by the testing procedures herein described gave a low temperature flexibility value of minus 21.4° C., a volatility value of 1.54 percent, a water-absorption value of 0.545 percent and a solids loss value of 0.103 percent. The hardness of the plasticized product was 82 before the volatility test and 81 after the volatility test.

When submitted to the above testing procedure, 2-(2-acetoxyethoxy)ethyl acetylricinoleate was found to be incompatible with polyvinyl chloride.

While the above example shows only a composition in which the ratio of plasticizer to polymer content is 40:60, the content of adduct to polyvinyl chloride may be widely varied, depending upon the properties desired in the final product. For many purposes a plasticizer content, of say, from only 10 percent to 20 percent is preferred. The present polycarboxylates are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 percent by weight of vinyl chloride and up to 49 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The present polycarboxylates are of general utility in softening vinyl chloride polymers. They may be used as the only plasticizing component in a compounded vinyl chloride polymer or they may be used in conjunction with other plasticizers.

What I claim is:

1. Polycarboxylates having the formula

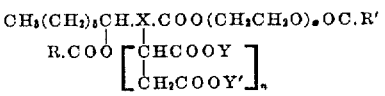

in which R, R', Y and Y' are alkyl radicals of from 1 to 5 carbon atoms, X is a mono-alkenyl radical of 10 carbon atoms and is a part of the acid portion of a ricinoleate, $n$ is an integer of from 1 to 3, and $x$ is an integer of from 1 to 5.

2. A polycarboxylate having the formula

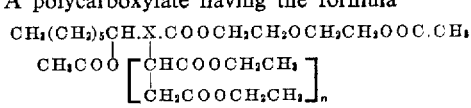

in which $n$ is an integer of 1 to 3 and X is a mono-alkenyl radical of 10 carbon atoms and is a part of the acid portion of a ricinoleate.

3. The method which comprises heating a dialkyl fumarate of from 6 to 14 carbon atoms with an alkyl acylricinoleate of the formula

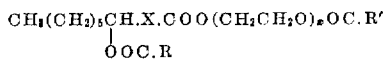

in which R and R' are alkyl radicals of from 1 to 5 carbon atoms, X is a mono-alkenyl radical of 10 carbon atoms and is a part of the acid portion of a ricinoleate, and $x$ is an integer of 1 to 5, and recovering from the resulting reaction product an adduct in which one mole of said ricinoleate is combined with from 1 to 3 moles of said fumarate.

4. The method which comprises heating 2-(2-acetoxyethoxy)ethyl acetylricinoleate with ethyl fumarate and recovering from the resulting reaction product an adduct in which one mole of said ricinoleate is combined with from 1 to 3 moles of said fumarate.

References Cited in the file of this patent
UNITED STATES PATENTS

| Number | Name | Date |
|---|---|---|
| 2,188,888 | Clocker | Jan. 30, 1940 |
| 2,310,395 | Carruthers | Feb. 9, 1943 |
| 2,396,763 | Ullmann | Mar. 19, 1946 |
| 2,408,905 | Black et al. | Oct. 8, 1946 |
| 2,510,915 | Spurlin | June 6, 1950 |
| 2,545,811 | Hetzel | Mar. 20, 1951 |
| 2,553,996 | Abbott | May 22, 1951 |
| 2,569,420 | Kosmin | Sept. 25, 1951 |
| 2,630,441 | Dazzi | Mar. 3, 1953 |
| 2,687,421 | Butler | Aug. 24, 1954 |

UNITED STATES PATENT OFFICE
CERTIFICATE OF CORRECTION

Patent No. 2,802,016

August 6, 1957

Joachim Dazzi

It is hereby certified that error appears in the printed specification of the above numbered patent requiring correction and that the said Letters Patent should read as corrected below.

Column 3, line 67, for "49 percent" read -- 30 percent --.

Signed and sealed this 17th day of December 1957.

(SEAL)
Attest:

KARL H. AXLINE
Attesting Officer

ROBERT C. WATSON
Commissioner of Patents